May 1, 1973

C. H. ODOM ET AL 3,730,689

APPARATUS FOR LEACHING CORE MATERIAL FROM SHEARED
SEGMENTS OF CLAD NUCLEAR FUEL PINS

Filed Feb. 12, 1971

INVENTORS.
Clyde H. Odom
BY Maurice H. Kunselmar

ATTORNEY.

United States Patent Office 3,730,689
Patented May 1, 1973

3,730,689
APPARATUS FOR LEACHING CORE MATERIAL FROM SHEARED SEGMENTS OF CLAD NUCLEAR FUEL PINS
Clyde H. Odom, Knoxville and Maurice H. Kunselman, Oak Ridge, Tenn., assignors to the United States of America as represented by the United States Atomic Energy Commission
Filed Feb. 12, 1971, Ser. No. 114,769
Int. Cl. B01d 11/02
U.S. Cl. 23—269  8 Claims

ABSTRACT OF THE DISCLOSURE

Apparatus is described for selectively dissolving or leaching one or more solid components of a mixture such as clad nuclear fuel pin segments. The apparatus includes a rotatable, generally cylindrical drum designed to operate with its longitudinal axis disposed horizontally. A plurality of perforated, radially extending, circular partitions are spaced apart along the drum axis to form a series of feed, leaching, and discharge compartments. Axial movement of solids through the drum is restricted by the partitions while the dissolvent is permitted to flow through the perforations therein in a substantially unrestricted manner. Transfer chutes in the shape of slotted, skewed, conical frustums are provided within each leaching compartment for transferring solids between compartments only when the drum rotation is reversed one turn with respect to its normal direction of rotation during a leaching operation. Mixing or agitation of the solids to enhance dissolution is accomplished without solids transfer during rotation of the drum by perforated mixing baffles which extend axially and radially within the peripheral region of each leaching compartment. Feed and discharge compartments containing transfer baffles are provided at opposite ends of the drum for receiving unprocessed mixtures and for discharging undissolved solids. Means for adding fresh dissolvent and for removing liquid containing dissolved solids are provided at the discharge and feed compartment ends of the drum, respectively.

BACKGROUND OF THE INVENTION

The invention described herein relates generally to chemical leachers and more particularly to improved apparatus for leaching fuel-containing core material from sheared segments of clad nuclear fuel pins. It was made in the course of, or under, a contract with the U.S. Atomic Energy Commission.

Economically attractive processing methods for recovering fissile and fertile materials from spent pin-type fuel assemblies used in nuclear reactors constitute a necessary and significant part of the over-all nuclear power reactor fuel cycle. Several chemical processes which have been developed to accomplish such recovery require dissolution of the entire fuel pin including its cladding. Commonly used cladding materials such as stainless steel and zirconium alloys are highly resistant to dissolution, however, and require highly reactive dissolvents with expensive and exotic materials of construction used in all process equipment exposed to such dissolvents. In addition, dissolution of the cladding necessarily generates large additional volumes of radioactive liquid wastes which must be disposed of.

As an alternative to these processes requiring dissolution of both cladding and core of depleted nuclear fuel pins, a process known as the Shear-Leach Process has been developed whereby fuel pins are first sheared into short segments and the core material then preferentially leached from the segments, leaving the cladding segments substantially intact. The Shear-Leach Process has two important advantages: Relatively low cost stainless steel processing equipment may be used to contain the less reactive dissolvents, and the cost of storing solid cladding waste produced therein is only about five percent of that of storing corresponding liquid wastes which would be produced if the cladding were also dissolved.

In the leaching step of the Shear-Leach Process, it is desired to preferentially dissolve or leach the nuclear fuel material from the fuel pin segments at a controlled rate and then separate the cladding material from the resulting solution. The apparatus used to accomplish these objectives must accept sheared nuclear fuel pins including dislodged core fines generated during the shearing step, dissolve the dislodged core fines and core material remaining in the sheared pin segments, and separate the remaining cladding segments from the leach solution. Also, it is desired that adequate mixing of the solids and leach solution be provided while the solids are being dissolved to ensure complete and relatively rapid dissolution. Solids must be advanced through the leaching apparatus in a controlled manner to avoid premature discharge of solids and loss of fuel material. Existing spiral screw-type leachers provide controlled transfer of solids but do not provide adequate mixing. Other existing leachers such as the vibrating tray type and the concrete mixer type provide adequate mixing but lack sufficient control of solid material advancement to ensure that no undissolved fuel passes through the leacher along with the undissolved cladding segments.

It is, accordingly, a general object of the invention to provide apparatus for selectively leaching one or more solid components of a mixture.

Another, more particular, object of the invention is to provide apparatus for selectively leaching one or more solid components of a mixture characterized by adequate mixing and controlled transfer of solids through the apparatus.

Other objects of the invention will become apparent upon examination of the following description of the invention and the appended drawings.

SUMMARY OF THE INVENTION

In accordance with the invention, apparatus for dissolving or leaching one or more solid components of a mixture is provided. The apparatus comprises a rotatable, generally cylindrical drum designed to operate with its longitudinal axis disposed horizontally. A plurality of perforated, radially extending, circular partitions are spaced apart along the drum axis to form a series of feed, leaching, and discharge compartments. Axial movement of solids through the drum is prevented by the partitions when the drum is rotated in one direction while dissolvement is permitted to flow in a substantially unrestricted manner through the perforations therein. Transfer chutes, in the shape of slotted, skewed, conical frustums having an integral baffle extending from one edge of the slot, are provided within each leaching compartment for transferring solids between adjacent compartments when the drum is rotated counter to the normal direction of rotation used to achieve mixing and dissolution. Such arrangement is highly beneficial in that the residence time of solids within the leaching compartments can be controlled as desired since mixing and agitation are accomplished independently of the solids transfer operation. Mixing of the solids to enhance dissolution is accomplished during rotation of the drum by perforated mixing baffles extending axially and radially within the peripheral region of each leaching compartment. Feed and discharge compartments containing solids transfer baffles are provided at opposite ends of the drum for receiving unprocessed mixtures and discharging undissolved solids. Means for adding fresh dissolvent and removing liquid containing dissolved solids are provided at the discharge and feed compartments, respectively. Adequate mixing and controlled advancement of fuel through the drum are accomplished by the unique transfer chutes which permit advancement of solids only when the drum is rotated opposite to the direction of rotation used to provide mixing.

DESCRIPTION OF THE PREFERRED EMBODIMENT

Figure 1:
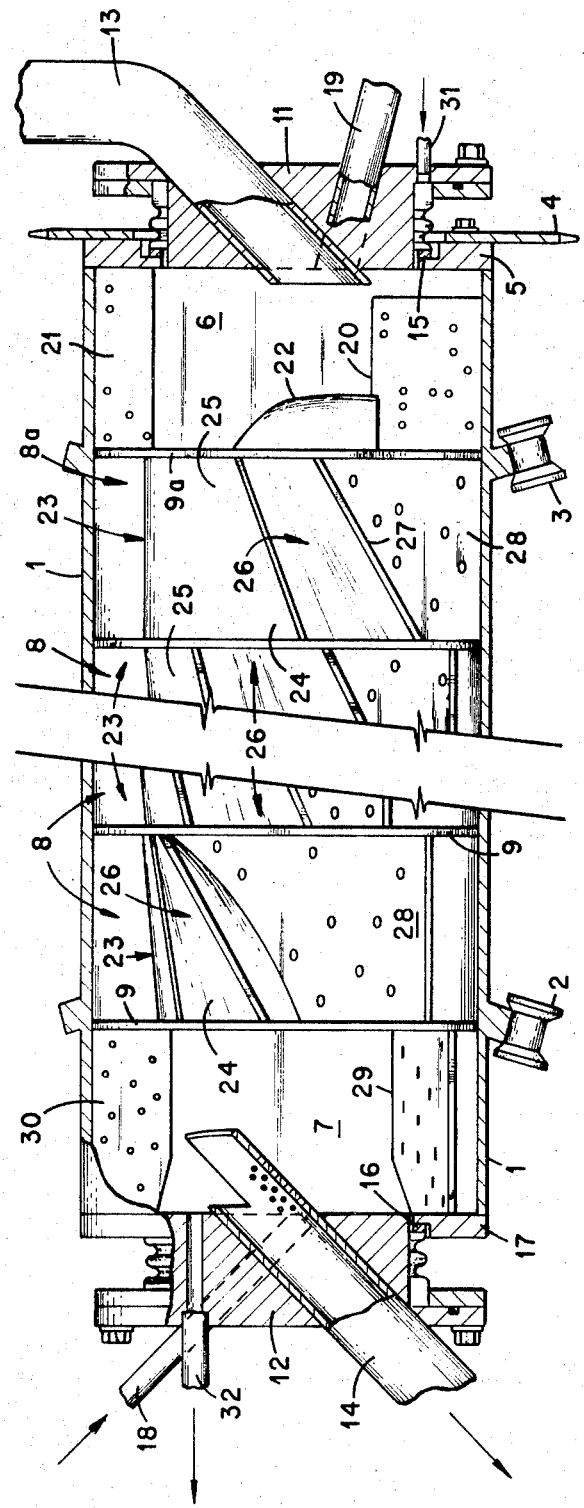
FIG. 1 is a vertical section of leaching apparatus made in accordance with the invention.
Figure 2:
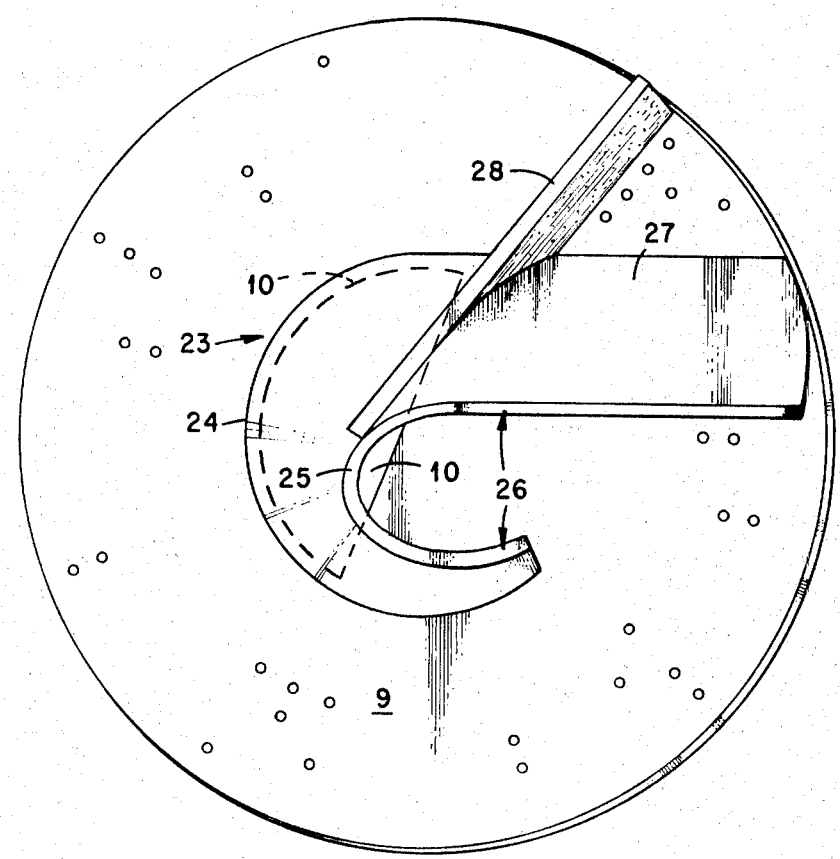
FIG. 2 is a plan view of a single circular partition, transfer chute, and mixing baffle as used in the leaching apparatus of FIG. 1.

In the preferred embodiment of the invention as shown in FIGS. 1 and 2, a horizontal drum 1 is rotatably supported by two each (only one of each shown) of rollers 2 and 3 which provide horizontal as well as vertical restraint. Rotation of drum 1 is accomplished by a drive means (not shown) coupled with sprocket wheel 4 which is fixed to annular end plate 5. The interior of drum 1 is divided into a feed compartment 6, a discharge compartment 7, and a plurality of identical leaching compartments 8 separated by perforated partitions 9. Each partition 9 is provided with a central opening 10 as shown in FIG. 2 to permit the transfer of solids between compartments. As shown, stationary drum heads 11 and 12 are provided with inclined openings for receiving feed and discharge tubes 13 and 14, respectively. Feed tube 13 permits either batch or continuous insertion of unprocessed sheared fuel pin segments into feed compartment 6 while discharge tube 14 receives undissolved solid residue such as cladding segments as it passes out of discharge compartment 7. Bellows suspended carbon face seals 15 and 16 are provided to seal drum head 11 to end plate 5 and drum head 12 to end plate 17. Dissolvent or rinse liquids are caused to enter drum 1 through an inlet pipe 18 at the solids discharge end of the drum and to exit through an overflow pipe 19, thereby providing a countercurrent flow of dissolvent and solids. Additional drainage of drum 1 may be accomplished when it is desired to completely empty the drum of dissolvent by removing a drain plug or opening a drain valve (not shown) provided in the lateral surface of drum 1 after the drum has been rotated to position the plug or valve in its lowermost position.

Within feed compartment 6, perforated baffles 20 and 21 are attached to drum 1 along a slight spiral pitch, while extending radially inward, with baffle 20 being positioned so as to pick up and spill solids into a transfer scoop 22 when the scoop is in an upright receiving position. As shown, transfer scoop 22 is in a downwardly inclined non-receiving position. Solids spilled from baffle 20 into transfer scoop 22 pass through central opening 10 in first partition 9a and into first leaching compartment 8a. Transfer scoop 22 is fixed to and rotatable with first partition 9a. Repeated rotation of drum 1 in the counterclockwise direction when viewed from the feed end thus causes all solids charged into feed compartment 6 to be transferred into first leaching compartment 8a.

Within each of the leaching compartments 8, a slotted transfer chute 23 having an open, slotted, skewed, conical shape extends the full axial distance between partitions 9. The larger-diameter end 24 of each transfer chute is secured to the partition at the solids discharge end of each leaching compartment so as to be substantially concentric with the drum periphery. The smaller truncated end 25 is secured to the partition at the solids entrance end of the compartment in a position displaced from central opening 10 to prevent solids discharging out of a prior compartment from bypassing any leaching compartment by passing directly through transfer chute 23 in a successive compartment. The width of slot 26 is selected to permit free passage of the solid mixture to be processed and the sloping sides of the transfer chute inclined sufficiently to ensure transfer of solids through the chute by gravitational force. Central openings 10 in each partition 9 are essentially semicircular in shape as shown in FIG. 2 and are sized and positioned to register with the large ends 24 of the transfer chutes. A solids transfer baffle 27, which functions to load all solids contained in a leaching compartment into a respective transfer chute in one clockwise revolution, is essentially an integral part of each transfer chute which extends outwardly to the wall of drum 1. Each baffle 27 is inclined with respect to the longitudinal axis of drum 1 at the same angle as the surface of transfer chute 23 where the chute and baffle meet since the baffle lies in a plane tangent to the chute surface. The inclined surface of the solids transfer baffle acts to propel solids both radially inward and forward toward the large discharge end 24 of a respective transfer chute 23 during a solids transfer operation while providing a countercurrent pumping action to the dissolvent when drum 1 is rotated in the opposite direction during the mixing and agitation part of the leaching operation.

As shown in the preferred embodiment, a perforated mixing baffle 28 extends axially and radially from the outside surface of transfer chute 23 to the wall of drum 1 at an angular position preceding the solids transfer baffle 27 by about 45 degrees during counterclockwise rotation of the drum. More efficient mixing of solids during the leaching cycle is provided by the axially and radially oriented mixing baffle 28 than could be provided by the solids transfer baffle which, due to its inclination, would tend to concentrate the solids along the intake side of each leaching comparement if used alone.

Operation

During a leaching operation, a solid mixture, such as sheared segments of clad nuclear fuel pins, is charged to feed compartment 6 in either a continuous or batchwise manner through feed tube 13. Counterclockwise rotation of drum 1 causes the solids in feed compartment 6 to be picked up by baffle 20 and a portion thereof dumped into the solids transfer scoop 22 with each rotation. Those solids which enter transfer scoop 22 immediately pass through opening 10 in partition 9a to first leaching compartment 8a. Continued counterclockwise rotation causes the solids to be repeatedly swept peripherally through liquid dissolvent in the lower part of compartment 8a, raised out of the liquid, and then spilled back into the dissolvent by the action of mixing baffle 28. At the same time, dissolvent is propelled axially along drum 1 through all the leaching compartments 8 by the pumping action of solids transfer baffles 27. When it is desired to move the solids upstream to a leaching compartment containing a greater dissolution ability and lower concentration of dissolved solids, the counterclockwise rotation of the drum is stopped and the direction of drum rotation reversed to clockwise. Within one revolution, all solids within each of the leaching compartments are moved toward discharge compartment 7 to the next adjacent compartment through the action of solids transfer baffles 27 and transfer chutes 23 without intermixing of the solids in each compartment. The above sequence of dissolution and solids transfer is repeated until all the leaching compartments have been traversed and only those solids, such as fuel pin cladding segments, which are not to be dissolved reach discharge compartment 7 where they are picked up by perforated baffles 29 and 30 and dumped into discharge tube 14. Baffles 29 and 30 and the end of the discharge tube 14 extending into discharge compartment 7 are perforated to minimize passage of dissolvent through discharge tube 14. Use of a sweep or purge gas may be desired where depleted nuclear fuel is being processed in order to remove and trap radioactive fission product gases. As shown, an inlet gas line 31 is adapted to discharge into the annular space between drum head 11 and the bellows support for face seal 15. The gas passes between drum head 11 and end plate 5, through compartments 6, 7, and 8, between drum head 12 and end plate 17, through the annular space between drum head 12 and the bellows support for face seal 16, and out through outlet gas line 32 to a trap (not shown). The dissolution and solids transfer time cycle is regulated to correspond with optimum dissolvent concentration and flow rate to optimize the differential solubility of the solids along with the geometrical and mechanical characteristics of the solids.

As shown in FIG. 1, the angular position of slots 26 in transfer chutes 23, mixing baffles 28, and solids transfer baffles 27 in respective leaching compartments may be staggered with respect to each other to present a more uniform weight distribution in drum 1, thereby providing a more uniform operating load to the drive motor. Total angular displacement between all stages must be limited to about 90 degrees, however, so that solids transfer from all compartments may be completed within one revolution of drum 1.

Although the illustrated preferred embodiment was particularly designed for leaching nuclear fuel pin segments in accordance with the Shear-Leach Process described above, it is not limited to use in nuclear fuel pin leaching and can be readily adapted to perform many other chemical processing operations where it is desired to contact solids and liquids ranging from ore leaching to food processing. For example, by eliminating the perforations in partitions 9, the apparatus of the invention can be used to mix liquids and slurries in discrete batches while advancing them at a controlled rate. Solids may also be processed in cleaning, pickling, rinsing, lubrication, degassing, and many other like operations using the subject apparatus. Thus, the illustrative embodiment should not be interpreted in a strictly limiting sense as it is intended that the scope of the invention be limited only by the appended claims.

What is claimed is:

1. Apparatus for selectively dissolving one or more solid components of a mixture comprising:
   (a) a generally cylindrical drum assembly disposed with its longitudinal axis horizontally oriented, said drum assembly being selectively rotatable in both directions about said longitudinal axis;
   (b) a multiplicity of perforated, radially extending circular partitions spaced apart, along the longitudinal axis of said drum assembly to form a solids feed compartment at one end of said drum assembly, a solids discharge compartment at the other end, and a plurality of leaching compartments therebetween, said perforated partitions permitting free transfer of liquid through said compartments while retaining solid components therein;
   (c) transfer chutes disposed within each of said leaching compartments for effecting transfer of solids therefrom in response to rotation of said drum assembly in one direction only; said transfer of solids occurring from each leaching compartment into an adjacent compartment of said compartments father removed from said solids feed compartment; each of said transfer chutes comprising a slotted, skewed, frusto-conical surface portion integrally joined along one side of said slot with a solids transfer baffle portion extending radially to the wall of said drum assembly and axially between adjacent partitions defining said leaching compartment, said solids transfer baffle being inclined with respect to said adjacent partitions; the larger base end of said frusto-conical surface portion being fixed to that partition of said adjacent partitions which is farther removed from said feed compartment in register with a central solids transfer opening in said farther removed partition;
   (d) means for inserting said mixture into said solids feed compartment;
   (e) means for removing undissolved solids from said solids discharge compartment;
   (f) means for inserting dissolvent into said solids discharge compartment; and
   (g) means for removing liquid containing dissolved solids from said solids feed compartment.

2. The apparatus of claim 1 wherein axially and radially oriented perforated mixing baffles are provided within each of said leaching compartments.

3. The apparatus of claim 1 wherein said means for inserting said mixture into said solids feed compartment comprises a fixed feed tube passing through the end of said drum assembly adjacent said feed compartment and opening into said feed compartment.

4. The apparatus of claim 1 wherein said means for removing undissolved solids from said solids discharge compartment comprises a fixed discharge tube passing through the end of said drum assembly adjacent said discharge compartment, the longitudinal axis of said discharge tube being inclined downward with respect to the longitudinal axis of said drum assembly, and at least one axially and radially oriented perforated-solids discharge baffle disposed within the peripheral region of said discharge compartment for dumping undissolved solids into said discharge tube upon rotation of said drum assembly.

5. The apparatus of claim 1 wherein said means for inserting dissolvent into said solids discharge compartment comprises an inlet pipe passing through the end of said drum assembly adjacent said discharge compartment.

6. The apparatus of claim 1 wherein said means for removing liquid containing dissolved solids from said solids feed compartment comprises an overflow pipe passing through the end of said drum assembly adjacent said feed compartment, the open end of said overflow pipe being positioned radially away from the wall of said drum assembly a distance sufficient to ensure that a desired level of dissolvent is maintained in said drum assembly during a leaching operation.

7. The apparatus of claim 1 wherein said feed compartment is provided with at least one axially and radially extending perforated baffle affixed to the wall of said drum assembly, and a transfer scoop affixed to the partition dividing said feed compartment from an adjacent leaching compartment for passing solids through said partition to said adjacent leaching compartment.

8. The apparatus of claim 1 wherein said solids transfer baffle portion lies in a plane extending tangentially to said frusto-conical surface portion where said solids transfer baffle meets said surface portion along one side of said slot.

References Cited

UNITED STATES PATENTS

| | | | |
|---|---|---|---|
| 2,337,137 | 12/1943 | Thompson | 23—269 |
| 2,173,546 | 9/1939 | Bowers | 23—269 |
| 3,297,410 | 1/1967 | De Tisle | 23—269 |

FOREIGN PATENTS 108,361  10/1958  Pakistan.

NORMAN YUDKOFF, Primary Examiner

S. J. EMERY, Assistant Examiner

U.S. Cl. X.R.

23—270 R